US009783006B2

(12) United States Patent
Kouda (10) Patent No.: US 9,783,006 B2
(45) Date of Patent: Oct. 10, 2017

(54) PNEUMATIC TIRE (75) Inventor: Hiraku Kouda, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 613 days.

(21) Appl. No.: 13/563,177

(22) Filed: Jul. 31, 2012

(65) Prior Publication Data
US 2013/0037190 A1    Feb. 14, 2013

(30) Foreign Application Priority Data
Aug. 10, 2011  (JP) ................. 2011-174583

(51) Int. Cl.
| B60C 11/11 | (2006.01) |
| B60C 11/12 | (2006.01) |
| B60C 11/03 | (2006.01) |
| B60C 11/13 | (2006.01) |

(52) U.S. Cl.
CPC .......... B60C 11/11 (2013.01); B60C 11/0306 (2013.01); B60C 11/1236 (2013.01); B60C 11/1376 (2013.01); B60C 2011/036 (2013.01); B60C 2011/0337 (2013.01); B60C 2011/0346 (2013.01); B60C 2011/0348 (2013.01); B60C 2011/0372 (2013.01); B60C 2011/1209 (2013.01); B60C 2011/1231 (2013.01)

(58) Field of Classification Search
CPC . B60C 11/1236; B60C 11/0306; B60C 11/11; B60C 11/12
USPC ............... 152/209.1, 209.17, 209.18, DIG. 3
See application file for complete search history.

(56) References Cited

U.S. PATENT DOCUMENTS

| 2,620,009 | A | * | 12/1952 | Giebhart .................. 152/209.18 |
| 3,645,313 | A | * | 2/1972 | Roberts et al. .......... 152/209.17 |
| 3,998,256 | A | * | 12/1976 | Verdier ...................... 152/209.1 |
| 4,351,381 | A | * | 9/1982 | Roberts .............. B60C 11/0306 |
| | | | | 152/209.18 |

(Continued)

FOREIGN PATENT DOCUMENTS

| CN | 201863648 | | 6/2011 |
| DE | 2128873 | * | 12/1972 |

(Continued)

OTHER PUBLICATIONS

English machine translation of DE2128873, dated Dec. 1972.*
English machine translation of JP2010-158982, dated Jul. 2010.*

Primary Examiner — Robert Dye
(74) Attorney, Agent, or Firm — Thorpe North & Western (57) ABSTRACT

A pneumatic tire including a tread portion, side wall portions, and bead portions, wherein the tread portion includes a plurality of circumferential grooves having a groove width of not less than 3.0 mm and which extend in a tire circumferential direction while meandering, and a plurality of lateral grooves having a groove width of not less than 3.0 mm and which communicate between a pair of circumferential grooves adjacent in a tire width direction. The circumferential grooves and the lateral grooves partition two rows of polygonal blocks formed by arranging a plurality of polygonal blocks, having a polygonal shape with not less than five corners, in a staggered manner along the tire circumferential direction. A polygonal rib extending in the tire circumferential direction is disposed between the two rows of polygonal blocks. The polygonal rib is adjacent to the two rows of polygonal blocks.

15 Claims, 3 Drawing Sheets (56) References Cited

U.S. PATENT DOCUMENTS

| | | | | |
|---|---|---|---|---|
| D274,715 S | * | 7/1984 | Baumgardner | D12/600 |
| 4,641,696 A | * | 2/1987 | Semin | B60C 11/0302 |
| | | | | 152/209.28 |
| 5,127,455 A | * | 7/1992 | Remick | 152/209.24 |
| 5,714,026 A | * | 2/1998 | Wakabayashi | B60C 11/00 |
| | | | | 152/DIG. 3 |
| 6,575,215 B1 | * | 6/2003 | Hino | B29C 43/24 |
| | | | | 152/209.15 |
| 7,237,588 B2 | * | 7/2007 | Suzuki | 152/209.5 |
| 8,746,303 B2 | * | 6/2014 | Ochi | 152/209.15 |
| 2002/0148545 A1 | * | 10/2002 | Nanni | B60C 1/0016 |
| | | | | 152/450 |
| 2003/0226629 A1 | * | 12/2003 | Kimishima | 152/209.18 |
| 2004/0211501 A1 | * | 10/2004 | Kajita | 152/209.15 |
| 2006/0254684 A1 | * | 11/2006 | Tamura | 152/209.18 |
| 2008/0041508 A1 | * | 2/2008 | Cambon et al. | 152/209.15 |
| 2010/0180997 A1 | * | 7/2010 | Shimizu | B60C 11/0306 |
| | | | | 152/209.18 |
| 2011/0062631 A1 | * | 3/2011 | Madden | B29C 35/02 |
| | | | | 264/326 |
| 2011/0108176 A1 | * | 5/2011 | Nakamizo | B60C 11/0306 |
| | | | | 152/209.18 |
| 2012/0216931 A1 | * | 8/2012 | Shiono | B60C 11/0306 |
| | | | | 152/209.18 |

FOREIGN PATENT DOCUMENTS

| | | | |
|---|---|---|---|
| GB | 403579 | * | 12/1933 |
| GB | 2051694 | * | 1/1981 |
| JP | 02-267007 | * | 10/1990 |
| JP | 2010-083462 | | 4/2010 |
| JP | 2010-158982 | * | 7/2010 |
| JP | 2011-025864 | | 2/2011 |
| WO | WO2011055681 | * | 5/2011 |

* cited by examiner

PNEUMATIC TIRE

PRIORITY CLAIM

Priority is claimed to Japan Patent Application Serial No. 2011-174583 filed on Aug. 10, 2011.

BACKGROUND

Technical Field

The present technology relates to a pneumatic tire in which plurality of polygonal blocks is disposed in a tread portion, and particularly relates to a pneumatic tire whereby braking performance on wet road surfaces and steering stability on dry road surfaces can be improved in a well-balanced manner.

Related Art

Conventionally, in pneumatic tires, a plurality of circumferential grooves extending in a tire circumferential direction and a plurality of lateral grooves extending in a tire width direction are formed in a tread portion, and multiple blocks are partitioned by these circumferential grooves and lateral grooves (e.g. see Japanese Unexamined Patent Application Publication No. 2010-83462A and Japanese Unexamined Patent Application Publication No. 2011-25864A). Additionally, sipes are formed in the blocks as necessary. In such a pneumatic tire, increasing the number of grooves and/or sipes in order to enhance water drainage performance and increase edge effect is effective for enhancing braking performance on wet road surfaces.

However, there is a problem in that when the number of grooves and/or sipes disposed in the tread portion is simply increased, rigidity of the tread portion decreases and steering stability on dry road surfaces declines. Additionally, investigation into narrowing the grooves in order to suppress the decline in the rigidity of the tread portion has been carried out. However, in cases where the grooves are narrowed, water drainage effects are insufficient. Moreover, in cases where the grooves have been narrowed and the number thereof increased, rigidity of the tread portion decreases. Therefore, it is difficult to achieve both braking performance on wet road surfaces and steering stability on dry road surfaces.

SUMMARY

The present technology provides a pneumatic tire whereby braking performance on wet road surfaces and steering stability on dry road surfaces can be improved in a well-balanced manner. A pneumatic tire of the present technology includes a tread portion extending in a tire circumferential direction to form an annular shape, a pair of side wall portions disposed on both sides of the tread portion, and a pair of bead portions disposed on inner sides in a tire radial direction of the side wall portions. The tread portion of said pneumatic tire includes a plurality of circumferential grooves having a groove width of not less than 3.0 mm and which extend in the tire circumferential direction while meandering, and a plurality of lateral grooves having a groove width of not less than 3.0 mm and which communicate between a pair of circumferential grooves adjacent in a tire width direction. The circumferential grooves and the lateral grooves partition two rows of polygonal blocks formed by arranging a plurality of polygonal blocks, having a polygonal shape with not less than five corners, in a staggered manner along the tire circumferential direction. A polygonal rib extending in the tire circumferential direction is disposed between the two rows of polygonal blocks, the polygonal rib being disposed adjacent to the two rows of polygonal blocks.

In the present technology, polygonal blocks having a polygonal shape with not less than five corners are formed and, compared to frequently used conventional quadrangular blocks, bend angles of the block edges are configured to be more obtuse, leading to an increase in block rigidity. Furthermore, by arranging a plurality of the polygonal blocks in a staggered manner along the tire circumferential direction, edge components of the tread portion can be sufficiently ensured and, thus, braking performance on wet road surfaces can be significantly enhanced. Additionally, a polygonal rib having high rigidity and provided with many edge components is disposed between the two rows of polygonal blocks, and the polygonal rib is adjacent to the two rows of polygonal blocks. Therefore, collapsing of the polygonal blocks can be suppressed, the decrease in rigidity of the tread portion accompanying the formation of the block rows can be compensated for, and steering stability on dry road surfaces can be enhanced. Thereby, both braking performance on wet road surfaces and steering stability on dry road surfaces can be achieved.

In the present technology, a shape of the polygonal blocks is preferably hexagonal. As a result, multiple polygonal blocks can be efficiently disposed in the tread portion and, based on the edge effect thereof, braking performance on wet road surfaces can be enhanced.

An area of the polygonal block unit is preferably from 2 $cm^2$ to 50 $cm^2$. As a result, both braking performance on wet road surfaces and steering stability on dry road surfaces can be improved in a well-balanced manner.

Sipes or shallow grooves are preferably provided in the polygonal blocks. In cases where the sipes or the shallow grooves are added to the polygonal blocks, braking performance on wet road surfaces can be further enhanced due to the edge effect imparted by the sipes or the shallow grooves. An extending direction of the sipes or the shallow grooves is preferably configured to be parallel with one side of the polygonal blocks. As a result, multiple sipes or shallow grooves can be efficiently disposed within the blocks and, based on the edge effect thereof, braking performance on wet road surfaces can be enhanced. Additionally, extending directions of the sipes or the shallow grooves are preferably configured so as to be mutually different between pairs of polygonal blocks adjacent in the tire circumferential direction. As a result, edge effects in multiple directions can be obtained and, therefore, steering stability on dry road surfaces can be enhanced.

Sipes or shallow grooves are preferably provided in the polygonal rib. In cases where the sipes or the shallow grooves are added to the polygonal rib, braking performance on wet road surfaces can be further enhanced due to the edge effect imparted by the sipes or the shallow grooves. Moreover, dimples or recesses are preferably provided in the polygonal rib. These dimples or recesses also contribute to the improvement of braking performance on wet road surfaces.

The two rows of polygonal blocks preferably are mutually configured to have a similar shape. Here, the "similar shape" of the two rows of polygonal blocks is defined as a structure in which the shape and dimensions of the polygonal blocks included in the two rows of polygonal blocks are mutually the same and the staggered arrangement patterns thereof match each other. By configuring the two rows of polygonal blocks so as to have a similar shape as described above, superior uneven wear resistance can be displayed when achieving both braking performance on wet road surfaces and steering stability on dry road surfaces.

The rows of polygonal blocks and the polygonal rib preferably are mutually configured to have a similar shape. Here, the "similar shape" shared by the rows of polygonal blocks and the polygonal rib is defined as a structure in which the polygonal rib has corners corresponding to the polygonal blocks included in the rows of polygonal blocks, the staggered arrangement pattern of the rows of polygonal blocks and the polygonal rib match each other, and a total area of the polygonal rib and a total area of the polygonal blocks included in the rows of polygonal blocks are substantially the same. Note that the total area of the polygonal rib shall be considered to be substantially the same as the total area of the polygonal blocks included in the rows of polygonal blocks and the lateral grooves between the polygonal blocks when the total area of the polygonal rib is within a range from 90% to 110% of the total area of the polygonal blocks included in the rows of polygonal blocks and the lateral grooves between the polygonal blocks. By configuring the rows of polygonal blocks and the polygonal rib so as to have a similar shape as described above, superior uneven wear resistance can be displayed when achieving both braking performance on wet road surfaces and steering stability on thy road surfaces.

DETAILED DESCRIPTION

Figure 1:
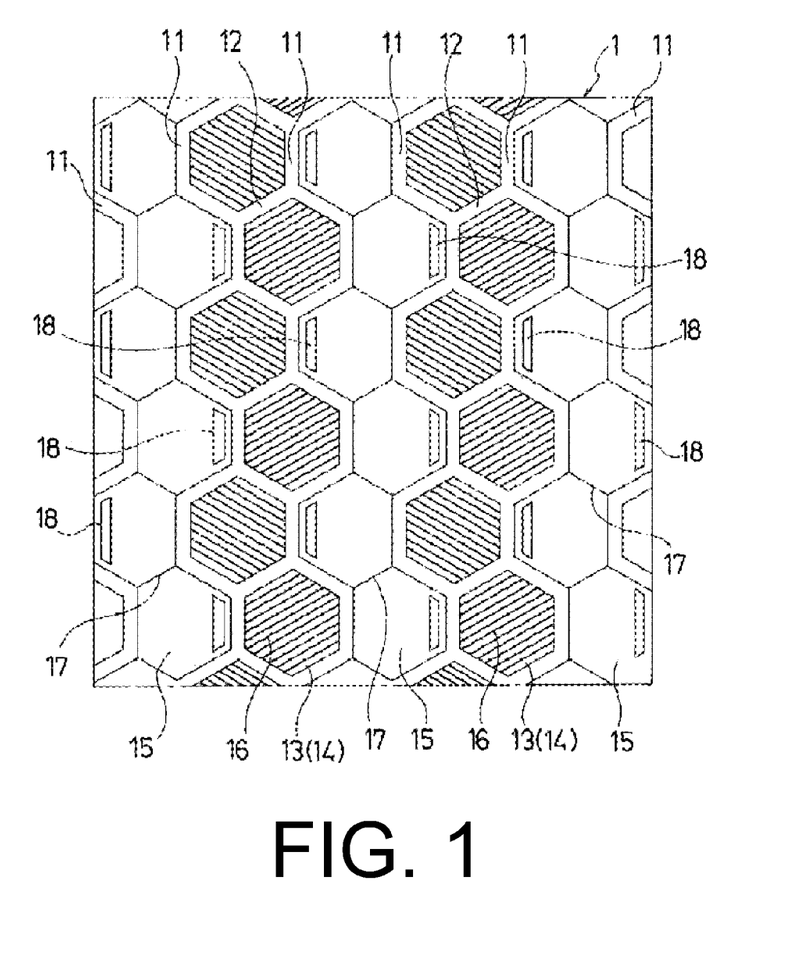
FIG. 1 is a development view illustrating a tread pattern of a pneumatic tire according to an embodiment of the present technology.
Figure 2:
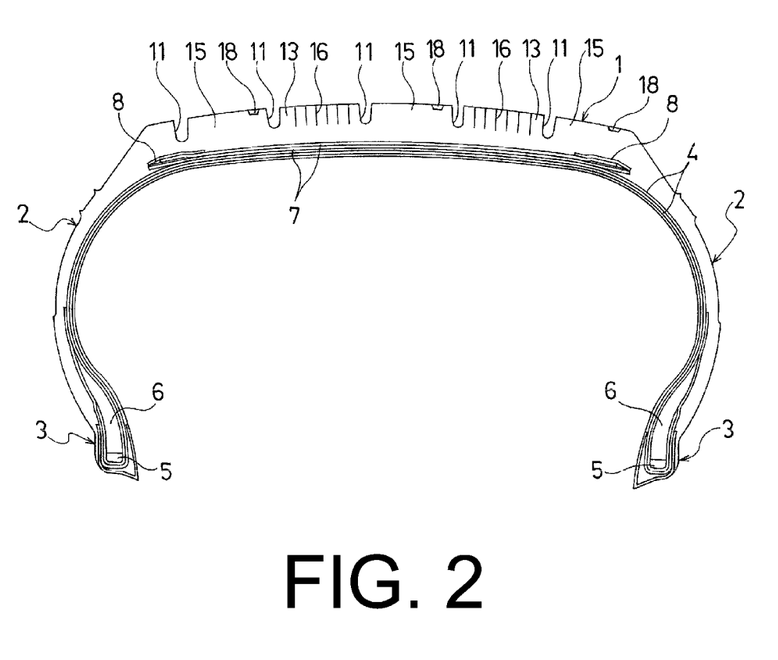
FIG. 2 is a meridian cross-sectional view illustrating the pneumatic tire according to the embodiment of the present technology.

Detailed descriptions will be given below of a configuration of the present technology with reference to the accompanying drawings. FIGS. 1 and 2 illustrate a pneumatic tire according to an embodiment of the present technology. As illustrated in FIGS. 1 and 2, a pneumatic tire of this embodiment is provided with a tread portion 1 extending in a tire circumferential direction to form an annular shape, a pair of side wall portions 2,2 that are disposed on both sides of the tread portion 1, and a pair of bead portions 3,3 that are disposed on inner sides in a tire radial direction of the side wall portions 2.

Two layers of a carcass layer 4 are mounted between the pair of bead portions 3,3. The carcass layer 4 includes a plurality of reinforcing cords extending in the tire radial direction, and is folded back around a bead core 5 disposed in each of the bead portions 3 from a tire inner side to a tire outer side. A bead filler 6 having a triangular cross-sectional shape formed from rubber composition is disposed on a periphery of the bead core 5.

On the other hand, a plurality of layers of a belt layer 7 is embedded on an outer circumferential side of the carcass layer 4 in the tread portion 1. These belt layers 7 include a plurality of reinforcing cords that incline with respect to the tire circumferential direction and the reinforcing cords are disposed between the layers so as to intersect each other. In the belt layers 7, an inclination angle of the reinforcing cords with respect to the tire circumferential direction is set in a range from, for example, 10° to 40°. Steel cords are preferably used as the reinforcing cords of the belt layers 7. For the purpose of enhancing high-speed durability, at least one layer of a belt cover layer 8 formed by arranging reinforcing cords at an angle of, for example, not more than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above is exemplary of a pneumatic tire, hut is not limited thereto.

As illustrated in FIG. 1, a plurality of circumferential grooves 11 extending in a tire circumferential direction while meandering, and a plurality of lateral grooves 12 communicating between a pair of circumferential grooves 11,11 adjacent in a tire width direction are formed in the tread portion 1. The circumferential grooves 11 meander and are different from see-through grooves that extend straight in the tire circumferential direction. Therefore, edge components can be ensured. A groove width of the circumferential grooves 11 is not less than 3.0 mm and is more preferably set in a range from 3.0 mm to 15.0 mm; a groove depth thereof is set in a range from 5.0 mm to 10.0 mm. A groove width of the lateral grooves 12 is not less than 3.0 mm and is more preferably set in a range from 3.0 mm to 10.0 mm; a groove depth thereof is set in a range from 3.0 mm to 10.0 mm. Water drainage performance can be sufficiently ensured by setting the groove widths of the circumferential grooves 11 and the lateral grooves 12 to be not less than 3.0 mm.

A plurality of polygonal blocks 13 having a polygonal shape with not less than five corners and preferably from five to eight corners is partitioned in the tread portion 1 by the circumferential grooves 11 and the lateral grooves 12. Two rows of polygonal blocks 14,14 formed by arranging these polygonal blocks 13 along the tire circumferential direction in a staggered manner are partitioned. That is, in each of the rows of polygonal blocks 14, a plurality of the polygonal blocks 13 aligned in the tire circumferential direction is arranged so as to alternately protrude toward a first side and a second side in the tire width direction. Examples of shapes of the polygonal blocks 13 include pentagonal, hexagonal, heptagonal, and octagonal, but a hexagonal shape like that illustrated in the drawings is preferable. When hexagonal, multiple polygonal blocks 13 can be efficiently disposed in the tread portion 1 and an edge effect thereof can be sufficiently obtained. Note that the corners of the polygonal blocks 13 may be chamfered.

A polygonal rib 15 extending in the tire circumferential direction is disposed between the two rows of polygonal blocks 14,14 described above. Contours on both sides in the tire width direction of the polygonal rib 15 are defined by the circumferential grooves 11 extending in the tire circumferential direction while meandering, and the polygonal rib 15 is disposed so as to be adjacent to the two rows of polygonal blocks 14,14. Likewise, another of the polygonal rib 15 is disposed on an outer side in the tire width direction of the row of polygonal blocks 14. As a result, each of the rows of polygonal blocks 14 is sandwiched by a pair of the polygonal ribs 15,15.

In the pneumatic tire described above, the polygonal blocks 13 having a polygonal shape with not less than five corners are formed and, compared to quadrangular blocks, bend angles of the block edges are configured to be more obtuse. Therefore, the rigidity of the polygonal blocks 13 can be increased. Furthermore, edge components of the tread portion 1 can be sufficiently ensured because the plurality of polygonal blocks 13 is arranged in a staggered manner along the tire circumferential direction. Braking performance on wet road surfaces can be significantly enhanced due to the increase in the block rigidity and the increase in the edge components described above. Additionally, a polygonal rib 15 having high rigidity and provided with many edge components is disposed between the two rows of polygonal blocks 14,14, and the polygonal rib 15 is adjacent to the two rows of polygonal blocks 14,14. Therefore, collapsing of the polygonal blocks 13 can be suppressed, the decrease in rigidity of the tread portion 1 accompanying the formation of the block rows 14 can be compensated for, and steering stability on dry road surfaces can be enhanced. As a result, both braking performance on wet road surfaces and steering stability on dry road surfaces can be achieved.

In the pneumatic tire described above, an area at a road contact surface of each of the polygonal blocks 13 is set in a range from 2 cm$^2$ to 50 cm$^2$, and is preferably set in a range from 10 cm$^2$ to 30 cm$^2$. As a result, both braking performance on wet road surfaces and steering stability on dry road surfaces can be improved in a well-balanced manner. If the area of the polygonal block 13 as a unit is less than 2 cm$^2$, rigidity will decline, which will lead to a decline in the effects of improving steering stability on dry road surfaces. On the other hand, if the area exceeds 50 cm$^2$, groove area will be insufficient, which will lead to a decline in the effects of improving braking performance on wet road surfaces.

In the pneumatic tire described above, a plurality of sipes 16 is formed in each of the polygonal blocks 13. Thus, sipes or shallow grooves can be added to the polygonal blocks 13. In this case, braking performance on wet road surfaces can be further enhanced due to the edge effect imparted by the sipes or the shallow grooves. Here, "sipes" are defined as grooves having a groove width from 0.3 mm to 1.5 mm and a groove depth that is not less than 2.0 mm and is not greater than the groove depth of the circumferential grooves. Additionally, "shallow grooves" are defined as grooves having a groove width from 0.3 mm to 1.5 mm and a groove depth from 0.2 film to 2.0 mm. That is, the formation of the shallow grooves is a surface processing on the road contact surface and particularly improves traveling characteristics immediately after start of use of the tire.

As illustrated in FIG. 1, an extending direction of the sipes or the shallow grooves is preferably configured to be parallel with one side of the polygonal blocks 13. As a result, multiple sipes or shallow grooves can be efficiently disposed within the polygonal blocks 13 and, based on the edge effect thereof, braking performance on wet road surfaces can be enhanced. Additionally, extending directions of the sipes or the shallow grooves are preferably configured on as to be mutually different between pairs of polygonal blocks 13,13 adjacent in the tire circumferential direction. As a result, edge effects in multiple directions can be obtained and, therefore, steering stability on dry road surfaces can be enhanced.

In the pneumatic tire described above, a plurality of sipes 17 is formed in the polygonal rib 15. Thus, sipes or shallow grooves can be added to the polygonal rib 15. In this case, braking performance on wet road surfaces can be further enhanced due to the edge effect imparted by the sipes or the shallow grooves. Note that while the dimensions of the sipes or the shallow grooves are as described above, integrity as a rib is not damaged by the adding of the sipes or shallow grooves having such dimensions.

In the pneumatic tire described above, a plurality of recesses 18 is formed in the polygonal rib 15. Thus, dimples or recesses can be added to the polygonal rib 15. In this case, braking performance on wet road surfaces can be improved due to the edge effect imparted by the dimples or the recesses. A planar shape of the dimples or recesses is not particularly limited, and can be rectangular, elliptical, oval, polygonal, star-shaped, or the like.

In the pneumatic tire described above, the two rows of polygonal blocks 14,14 are mutually configured to have a similar shape. Furthermore, the rows of polygonal blocks 14 and the polygonal rib 15 are mutually configured to have a similar shape. Superior uneven wear resistance can be displayed when achieving both braking performance on wet road surfaces and steering stability on dry road surfaces because the two rows of polygonal blocks 14,14 are mutually configured to have a similar shape and the rows of polygonal blocks 14 and the polygonal rib 15 are mutually configured to have a similar shape, as described above.

Figure 3:
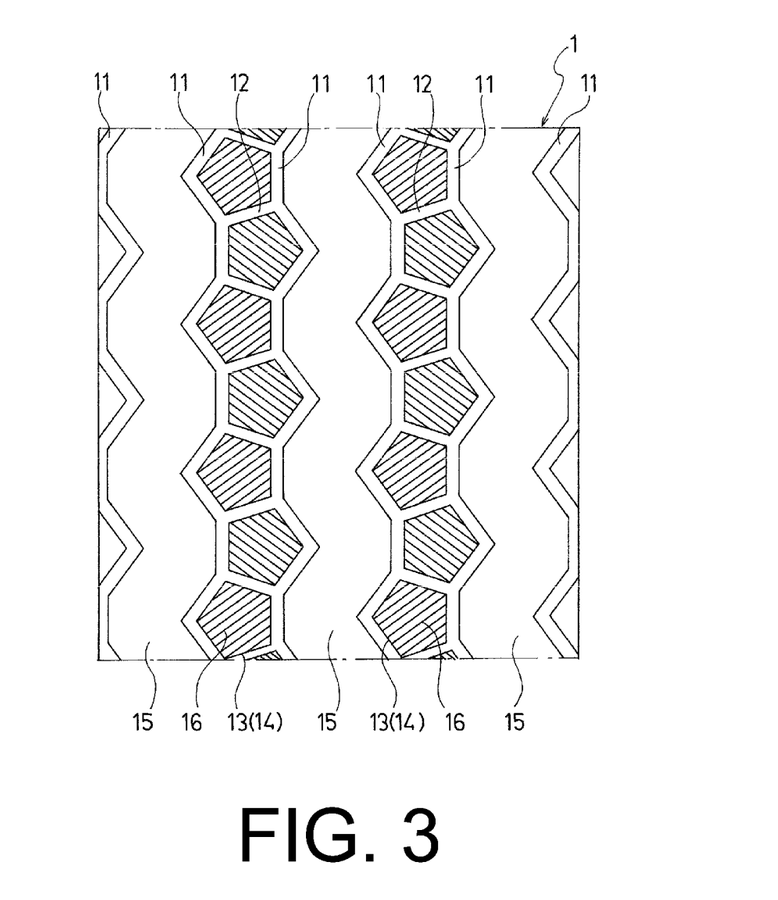
FIG. 3 is a development view illustrating a tread pattern of a pneumatic tire according to another embodiment of the present technology.

FIG. 3 illustrates a tread pattern of a pneumatic tire according to another embodiment of the present technology. As illustrated in FIG. 3, a plurality of circumferential grooves 11 extending in the tire circumferential direction while meandering, and a plurality of lateral grooves 12 communicating between a pair of circumferential grooves 11,11 adjacent in the tire width direction are formed in the tread portion 1. As a result, two rows of polygonal blocks 14,14 formed by arranging a plurality of polygonal blocks 13 having a pentagonal shape in a staggered manner along the tire circumferential direction are partitioned in the tread portion 1. A polygonal rib 15 extending in the tire circumferential direction is disposed between the two rows of polygonal blocks 14,14 and, likewise, another of the polygonal rib 15 is disposed on an outer side in the tire width direction of the row of polygonal blocks 14. Additionally, a plurality of sipes 16 is formed in each of the polygonal blocks 13. Note that while the two rows of polygonal blocks 14,14 are mutually configured to have a similar shape, the rows of polygonal blocks 14 and the polygonal rib 15 are not mutually configured to have a similar shape.

With the pneumatic tire configured as described above, as with the embodiment described therebefore, both braking performance on wet road surfaces and steering stability on dry road surfaces can be achieved.

Working Examples

Tires of Working Examples 1 to 9 were fabricated. A common tire size of 205/55R16 was used. Each of the tires included a tread portion extending in a tire circumferential direction to form an annular shape, a pair of side wall portions disposed on both sides of the tread portion, and a pair of bead portions disposed on inner sides in a tire radial direction of the side wall portions. The tread portion of said tires included a plurality of circumferential grooves extending in the tire circumferential direction while meandering, and a plurality of lateral grooves communicating between a pair of circumferential grooves adjacent in a tire width direction. The circumferential grooves and the lateral grooves partition two rows of polygonal blocks formed by arranging a plurality of polygonal blocks, having a polygonal shape, in a staggered manner along the tire circumferential direction. A polygonal rib extending in the tire circumferential direction is disposed at positions between the two rows of polygonal blocks and on an outer side in the tire width direction of the rows of polygonal blocks, the polygonal rib being disposed adjacent to the two rows of polygonal blocks. Specific structural details of the tires were varied as shown in Table 1.

A tire for Conventional Example 1 was also prepared for comparison. In this tire, a plurality of circumferential grooves extending in the tire circumferential direction and a plurality of lateral grooves extending in the tire width direction were provided in a tread portion. The circumferential grooves and the lateral grooves partitioned five rows of polygonal blocks formed by arranging a plurality of polygonal blocks having a quadrangular shape, in tandem along the tire circumferential direction. Moreover, the rib extending from the tread portion in the tire circumferential direction was omitted.

Additionally, a tire for Comparative Example 1 was prepared. In this tire, a plurality of circumferential grooves extending in the tire circumferential direction while meandering, and a plurality of lateral grooves communicating between a pair of circumferential grooves adjacent in the tire width direction were provided in a tread portion. The circumferential grooves and the lateral grooves partitioned five rows of polygonal blocks formed by arranging a plurality of polygonal blocks having a polygonal shape in a tandem along the tire circumferential direction. Moreover, the rib extending from the tread portion in the tire circumferential direction was omitted.

Furthermore, a tire for Comparative Example 2 was prepared. In this tire, a plurality of circumferential grooves extending in the tire circumferential direction while meandering, and a plurality of lateral grooves communicating between a pair of circumferential grooves adjacent in the tire width direction were provided in a tread portion. The circumferential grooves and the lateral grooves partitioned three rows of polygonal blocks formed by arranging a plurality of polygonal blocks having a polygonal shape in a staggered manner along the tire circumferential direction. Moreover, a polygonal rib extending in the tire circumferential direction was disposed at a position on an outer side in the tire width direction of the rows of polygonal blocks.

In Conventional Example 1, Comparative Examples 1 and 2, and Working Examples 1 to 9, the groove width of the circumferential grooves was 7.0 mm and the groove depth thereof was 8.0 mm. On the other hand, the groove width of the lateral grooves was 7.0 mm and the groove depth thereof was 8.0 mm.

Rib arrangement, block arrangement, block shape, block area, in-block sipes, in-block sipe orientation, in-block sipe orientation variation, in-rib sipes, similarity relation between the rows of blocks and the rib are shown in Table Regarding the in-block sipe orientation, an indication of "horizontal" means that the sipe is extending in the tire width direction, and an indication of "parallel" means that the extending direction of the sipe is parallel with one side of the block. Regarding the in-block sipe orientation variation, an indication of "no variation" means that the extending direction of the in-block sipes is constant throughout the entire tread portion, and an indication of "varies" means that the extending direction of the in-block sipes differs between pairs of blocks adjacent in the tire circumferential direction.

These test tires were evaluated for braking performance on wet road surfaces, steering stability on dry road surfaces, and uneven wear resistance according to the following evaluation methods. The results thereof are shown in Table 1.

Braking Performance on Wet Road Surfaces

The test tires were assembled on wheels with a rim size of 16×6.5JJ, inflated to an air pressure of 230 kPa, and mounted on a test vehicle (front wheel drive vehicle) having an engine displacement of 2,000 cc. Braking distance was measured after braking from a state of driving at a speed of 100 km/h until the vehicle came to a stop on a test course with a wet road surface. The evaluation results were indexed using the inverse of the measurement values, Conventional Example 1 being assigned an index value of 100. A larger index value indicates shorter braking distance and superior braking performance on wet road surfaces.

Steering Stability on Dry Road Surfaces

The test tires were assembled on wheels with a rim size of 16×6.5JJ, inflated to an air pressure of 230 kPa, and mounted on a test vehicle (front wheel drive vehicle) having an engine displacement of 2,000 cc. Feeling evaluations on a test course with a dry road surface by a test driver were carried out. Evaluation results were expressed as index values, Conventional Example 1 being assigned an index value of 100. Larger index values indicate superior steering stability.

Uneven Wear Resistance

The test tires were assembled on wheels with a rim size of 16×6.5JJ, inflated to an air pressure of 230 kPa, and mounted on a test vehicle (front wheel drive vehicle) having an engine displacement of 2,000 cc. After driving on a paved road for 50,000 km, the amount of wear of the rib and the rows of blocks was measured and the difference between these measurements was calculated. The evaluation results were indexed using the inverse of the difference in amount of wear, Conventional Example 1 being assigned an index value of 100. Larger index values indicate superior uneven wear resistance.

TABLE 1

|  | Conventional Example 1 | Comparative Example 1 | Comparative Example 2 | Working Example 1 | Working Example 2 | Working Example 3 |
|---|---|---|---|---|---|---|
| Rib arrangement | — | — | Outside of rows of blocks | Between rows of blocks | Between rows of blocks | Between rows of blocks |
| Block arrangement | Tandem | Tandem | Staggered | Staggered | Staggered | Staggered |
| Block shape | Quadrangular | Hexagonal | Hexagonal | Pentagonal | Hexagonal | Hexagonal |
| Block area (cm$^2$) | 20 | 20 | 20 | 60 | 60 | 20 |
| In-block sipes | Present | Present | Absent | Absent | Absent | Absent |
| In-block sipe orientation | Horizontal | Horizontal | — | — | — | — |
| In-block sipe orientation variation | No variation | No variation | — | — | — | — |

TABLE 1-continued

|  |  |  |  |  |  |  |
|---|---|---|---|---|---|---|
| In-rib sipes | — | — | Present | Absent | Absent | Absent |
| Similarity relation between the rows of blocks | Similar | Similar | Similar | Similar | Similar | Similar |
| Similarity relation between the rows of blocks and the rib | — | — | Not similar | Not similar | Similar | Similar |
| Braking performance on wet road surfaces | 100 | 104 | 100 | 102 | 104 | 106 |
| Steering stability on dry road surfaces | 100 | 100 | 98 | 105 | 105 | 105 |
| Uneven wear resistance | 100 | 100 | 105 | 105 | 105 | 105 |

|  | Working Example 4 | Working Example 5 | Working Example 6 | Working Example 7 | Working Example 8 | Working Example 9 |
|---|---|---|---|---|---|---|
| Rib arrangement | Between rows of blocks | Between rows of blocks | Between rows of blocks | Between rows of blocks | Between rows of blocks | Between rows of blocks |
| Block arrangement | Staggered | Staggered | Staggered | Staggered | Staggered | Staggered |
| Block shape | Hexagonal | Hexagonal | Hexagonal | Hexagonal | Hexagonal | Hexagonal |
| Block area (cm$^2$) | 20 | 20 | 20 | 20 | 20 | 20 |
| In-block sipes | Present | Present | Present | Present | Present | Present |
| In-block sipe orientation | Horizontal | Parallel | Parallel | Parallel | Parallel | Parallel |
| In-block sipe orientation variation | No variation | No variation | Varies | Varies | Varies | Varies |
| In-rib sipes | Absent | Absent | Absent | Present | Present | Present |
| Similarity relation between the rows of blocks | Similar | Similar | Similar | Similar | Similar | Not similar |
| Similarity relation between the rows of blocks and the rib | Similar | Similar | Similar | Similar | Not similar | Not similar |
| Braking performance on wet road surfaces | 108 | 108 | 108 | 110 | 110 | 110 |
| Steering stability on dry road surfaces | 105 | 108 | 110 | 108 | 108 | 108 |
| Uneven wear resistance | 110 | 110 | 110 | 110 | 107 | 105 |

As is clear from Table 1, compared with Conventional Example 1, with each of the tires of Working Examples 1 to 9, braking performance on wet road surfaces and steering stability on dry road surfaces were improved in a well-balanced manner. On the other hand, with the tire of Comparative Example 1, while rows of polygonal blocks formed from a plurality of polygonal blocks were provided in the tread portion, the polygonal rib was not provided and, as a result, effects of improving steering stability on dry road surfaces were not obtained. With the tire of Comparative Example 2, while rows of polyclonal blocks formed from a plurality of polyclonal blocks were provided in the tread portion, the polygonal rib was disposed at a position on an outer side in the tire width direction of the rows of polygonal blocks and, as a result, effects of improving braking performance on wet road, surfaces based on the polygonal blocks could not be effectively realized. Moreover, steering stability on dry road surfaces was negatively affected.

What is claimed is:

1. A pneumatic tire comprising a tread portion extending in a tire circumferential direction to form an annular shape, a pair of side wall portions disposed on both sides of the tread portion, and a pair of bead portions disposed on inner sides in a tire radial direction of the side wall portions; the tread portion of said pneumatic tire comprising a plurality of circumferential grooves having a groove width of not less than 3.0 mm and which extend in the tire circumferential direction while meandering, and a plurality of lateral grooves having a groove width of not less than 3.0 mm and which communicate between a pair of circumferential grooves adjacent in a tire width direction, wherein, the circumferential grooves and the lateral grooves partition two rows of polygonal blocks formed by arranging a plurality of polygonal blocks, having a polygonal shape with not less than five corners, in a staggered manner along the tire circumferential direction;

a polygonal rib extending in the tire circumferential direction is disposed between the two rows of polygonal blocks, the polygonal rib being disposed adjacent to the two rows of polygonal blocks, linearly extending sipes or shallow grooves are provided in each of the polygonal blocks, a shape of each of the polygonal blocks is a convex hexagon, the shape having a perimeter defining the convex hexagon which is uninterrupted by a groove, and the rows of polygonal blocks and the polygonal rib are mutually configured to have a similar shape, wherein the similar shape shared by the rows of polygonal blocks and the polygonal rib is defined as a structure in which the polygonal rib has corners corresponding to the polygonal blocks included in the rows of polygonal blocks, the staggered arrangement pattern of the rows of polygonal blocks and the polygonal rib match each other, and a total area of the polygonal rib and a total area of the polygonal blocks included in the rows of polygonal blocks are substantially the same.

2. The pneumatic tire according to claim 1, wherein an extending direction of the sipes or shallow grooves is configured to be parallel with one side of the polygonal blocks.

3. The pneumatic tire according to claim 1, wherein all the sipes or shallow grooves are substantially parallel in each of the polygonal blocks, and extending directions of the sipes or shallow grooves are configured so as to be mutually different in all pairs of polygonal blocks adjacent in the tire circumferential direction.

4. The pneumatic tire according to claim 1, wherein sipes or shallow grooves are provided in the polygonal rib.

5. The pneumatic tire according to claim 1, wherein dimples or recesses are provided in the polygonal rib.

6. The pneumatic tire according to claim 1, wherein at least four sides of the convex hexagon have a same length.

7. The pneumatic tire according to claim 1, wherein the convex hexagon is a regular hexagon.

8. The pneumatic tire according to claim 1, wherein each of the rows of polygonal blocks is sandwiched by a pair of polygonal ribs, each of the polygonal ribs extends in the tire circumferential direction.

9. The pneumatic tire according to claim 1, wherein the polygonal rib is defined by the circumferential grooves.

10. The pneumatic tire according to claim 1, wherein another polygonal rib is disposed at a position on an outer side of at least one of the two rows of the polygonal blocks in the tire width direction.

11. A pneumatic tire comprising a tread portion extending in a tire circumferential direction to form an annular shape, a pair of side wall portions disposed on both sides of the tread portion, and a pair of bead portions disposed on inner sides in a tire radial direction of the side wall portions; the tread portion of said pneumatic tire comprising a plurality of circumferential grooves which extend in the tire circumferential direction and a plurality of lateral grooves which communicate between a pair of circumferential grooves adjacent in a tire width direction, wherein the circumferential grooves and the lateral grooves partition two rows of polygonal blocks formed by arranging a plurality of polygonal blocks, having a polygonal shape in a staggered manner along the tire circumferential direction, wherein each of the polygonal blocks comprise a plurality of substantially parallel linearly extending sipes;

a polygonal rib extending in the tire circumferential direction is disposed between the two rows of polygonal blocks, the polygonal rib being disposed adjacent to the two rows of polygonal block;

a shape of each of the polygonal blocks is a convex hexagon, the shape having a perimeter defining the convex hexagon which is uninterrupted by a groove; and the rows of polygonal blocks and the polygonal rib are mutually configured to have a similar shape, wherein the similar shape shared by the rows of polygonal blocks and the polygonal rib is defined as a structure in which the polygonal rib has corners corresponding to the polygonal blocks included in the rows of polygonal blocks, the staggered arrangement pattern of the rows of polygonal blocks and the polygonal rib match each other, and a total area of the polygonal rib and a total area of the polygonal blocks included in the rows of polygonal blocks are substantially the same.

12. The pneumatic tire according to claim 11, wherein the plurality of linearly extending sipes extend from one side of a polygonal block to an opposing side of the polygonal block and wherein adjacent sipes are not connected to one another.

13. The pneumatic tire according to claim 12, wherein the plurality of linearly extending sipes in a first polygonal block are oriented non parallel with respect to the plurality of linearly extending sipes in an adjacent second polygonal block.

14. The pneumatic tire according to claim 11, wherein each of the rows of polygonal blocks is sandwiched by a pair of polygonal ribs, each of the polygonal ribs extends in the tire circumferential direction.

15. The pneumatic tire according to claim 11, wherein another polygonal rib is disposed at a position on an outer side of at least one of the two rows of the polygonal blocks in the tire width direction.

* * * * *